United States Patent
Tokgoz et al.

(10) Patent No.: US 11,963,183 B2
(45) Date of Patent: Apr. 16, 2024

(54) UPLINK DATA SCHEDULING FOR PREDICTABLE TRAFFIC

(71) Applicant: QUALCOMM Incorporated, San Diego, CA (US)

(72) Inventors: Yeliz Tokgoz, San Diego, CA (US); Linhai He, San Diego, CA (US); Jay Kumar Sundararajan, San Diego, CA (US); Gavin Bernard Horn, La Jolla, CA (US); Hwan Joon Kwon, San Diego, CA (US); Prashanth Haridas Hande, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 263 days.

(21) Appl. No.: 17/301,693

(22) Filed: Apr. 12, 2021

(65) Prior Publication Data

US 2021/0329690 A1    Oct. 21, 2021

Related U.S. Application Data

(60) Provisional application No. 63/010,512, filed on Apr. 15, 2020.

(51) Int. Cl.
*H04W 72/23* (2023.01)
*H04W 72/21* (2023.01)

(52) U.S. Cl.
CPC ........... *H04W 72/23* (2023.01); *H04W 72/21* (2023.01)

(58) Field of Classification Search
CPC .............................. H04W 72/23; H04W 72/21
See application file for complete search history.

(56) References Cited

U.S. PATENT DOCUMENTS

| | | | | |
|---|---|---|---|---|
| 9,345,048 | B2* | 5/2016 | Paiva | H04W 74/0833 |
| 9,894,651 | B2* | 2/2018 | Novlan | H04W 72/20 |
| 2011/0044266 | A1* | 2/2011 | Shrivastava | H04W 8/26 370/329 |
| 2012/0320837 | A1* | 12/2012 | Kim | H04L 5/0092 370/329 |
| 2015/0358958 | A1* | 12/2015 | Terry | H04B 7/2621 370/329 |
| 2019/0320467 | A1* | 10/2019 | Freda | H04L 5/0055 |
| 2020/0275413 | A1* | 8/2020 | Zhang | H04W 36/06 |
| 2022/0095332 | A1* | 3/2022 | Li | H04W 72/1268 |
| 2023/0016744 | A1* | 1/2023 | Low | H04W 36/0044 |

* cited by examiner

*Primary Examiner* — Jasper Kwoh
(74) *Attorney, Agent, or Firm* — Harrity & Harrity, LLP

(57) ABSTRACT

In some aspects of a wireless communication system, a user equipment (UE) may determine and transmit a configuration of a periodicity and a burst size for periodically transmitting uplink data communications to a base station. The UE may periodically receive, from the base station, uplink data grants based at least in part on the periodicity and the burst size of the configuration, and periodically transmit uplink data communications based at least in part on the periodicity and the burst size of the configuration. Numerous other aspects are provided.

30 Claims, 8 Drawing Sheets

500 ⟶

530
Determine one or more configurations that indicate periodicity and burst size for periodically transmitting uplink data communications

535
Transmit information specifying configurations

540
Select configuration for uplink data communications

545
Share configuration selection

BS 510

UE 520

| | | Cloud gaming | VR split rendering | AR split computation |
|---|---|---|---|---|
| Uplink traffic features | File size | 1 KB | 100 B | Flow1: 100 B, Flow2: 200 KB |
| | File arrival | Periodic: 10 ms | Periodic: 1.25 ms | Flow1: Periodic: 1.25 ms Flow2: Periodic: 100 ms |
| | Bit-rate | 800 Kbps | 640 – 2300 Kbps | Flow1: 640 Kbps Flow2: 16 Mbps |
| | Packet format | UDP | UDP | UDP |
| Uplink requirements | File (FER) or Packet (PER) Error Rate | FER: 1e-2 | FER: 1e-2 | Flow1: FER: 1e-2 Flow2: FER: 1e-4 |
| | Packet Delay Budget | 10 ms | 1.25 ms | Flow1: 1.25 ms Flow2: 100 ms |
| Downlink traffic features | File size | [4, 60] KB | [4, 60] KB | [4, 60] KB |
| | File arrival | Files (slices) spread around by ~3 ms every 1/fps. | Files (slices) spread around by ~3 ms every 1/(2*fps) | Files (slices) spread around by ~3 ms every 1/(2*fps) |
| | Bit-rate | 25 Mbps | 100-250 Mbps | 100-250 Mbps |
| | Packet format | UDP | RTP-UDP | RTP-UDP |
| Downlink requirements | File (FER) or Packet (PER) Error Rate | FER: 1e-3 | FER: 1e-3 | FER: 1e-3 |
| | Packet Delay Budget | 15 ms | 10 ms | 10 ms |

UPLINK DATA SCHEDULING FOR PREDICTABLE TRAFFIC

CROSS-REFERENCE TO RELATED APPLICATION

This Patent application claims priority to U.S. Provisional Patent Application No. 63/010,512, filed on Apr. 15, 2020, entitled "UPLINK DATA SCHEDULING FOR PREDICTABLE TRAFFIC," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink data scheduling for predictable traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include determining a configuration of a periodicity and a burst size for periodically transmitting uplink data communications to a base station. The method may include transmitting an indication of the configuration. The method may include periodically receiving, from the base station, uplink data grants based at least in part on the periodicity and the burst size of the configuration, and periodically transmitting, to the base station, uplink data communications based at least in part on the periodicity and the burst size of the configuration. Each uplink data communication may be based at least in part on an uplink data grant.

In some aspects, a method of wireless communication, performed by a base station, may include periodically transmitting uplink grants to a UE for respective uplink data communications, based at least in part on a configuration of a periodicity and a burst size that the UE uses for periodically transmitting uplink data communications, and periodically receiving, from the UE, uplink data communications based at least in part on periodically transmitting the uplink grants.

In some aspects, a UE for wireless communication may include a memory and one or more processors operatively coupled to the memory. The memory and the one or more processors may be configured to determine a configuration of a periodicity and a burst size for periodically transmitting uplink data communications to a base station. The memory and the one or more processors may be configured to transmit an indication of the configuration. The memory and the one or more processors may be configured to periodically receive, from the base station, uplink data grants based at least in part on the periodicity and the burst size of the configuration, and periodically transmit, to the base station, uplink data communications based at least in part on the periodicity and the burst size of the configuration. Each uplink data communication may be based at least in part on an uplink data grant.

In some aspects, a base station for wireless communication may include a memory and one or more processors operatively coupled to the memory. The memory and the one or more processors may be configured to periodically transmit uplink grants to a UE for respective uplink data communications, based at least in part on a configuration of a periodicity and a burst size that the UE uses for periodically transmitting uplink data communications, and periodically receive, from the UE, uplink data communications based at least in part on periodically transmitting the uplink grants.

In some aspects, a non-transitory computer-readable medium may store one or more instructions for wireless communication. The one or more instructions, when executed by one or more processors of a UE, may cause the one or more processors to determine a configuration of a periodicity and a burst size for periodically transmitting uplink data communications to a base station, and transmit an indication of the configuration. The one or more instructions, when executed by the one or more processors of the UE, may cause the one or more processors to periodically receive, from the base station, uplink data grants based at least in part on the periodicity and the burst size of the configuration and periodically transmit, to the base station, uplink data communications based at least in part on the periodicity and the burst size of the configuration. Each uplink data communication may be based at least in part on an uplink data grant.

In some aspects, a non-transitory computer-readable medium may store one or more instructions for wireless communication. The one or more instructions, when executed by one or more processors of a base station, may cause the one or more processors to periodically transmit uplink grants to the UE for respective uplink data communications, based at least in part on a configuration of a periodicity and a burst size that the UE uses for periodically transmitting uplink data communications, and periodically receive, from the UE, uplink data communications based at least in part on periodically transmitting the uplink grants.

In some aspects, an apparatus for wireless communication may include means for determining a configuration of a periodicity and a burst size for periodically transmitting uplink data communications to a base station, means for transmitting an indication of the configuration, means for periodically receiving, from the base station, uplink data grants based at least in part on the periodicity and the burst size of the configuration, and means for periodically transmitting, to the base station, uplink data communications based at least in part on the periodicity and the burst size of the configuration, where each uplink data communication is based at least in part on an uplink data grant.

In some aspects, an apparatus for wireless communication may include means for periodically transmitting uplink grants to a UE for respective uplink data communications, based at least in part on a configuration of a periodicity and a burst size that the UE uses for periodically transmitting uplink data communications, and means for periodically receiving, from the UE, uplink data communications based at least in part on periodically transmitting the uplink grants.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of extended reality application characteristics, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
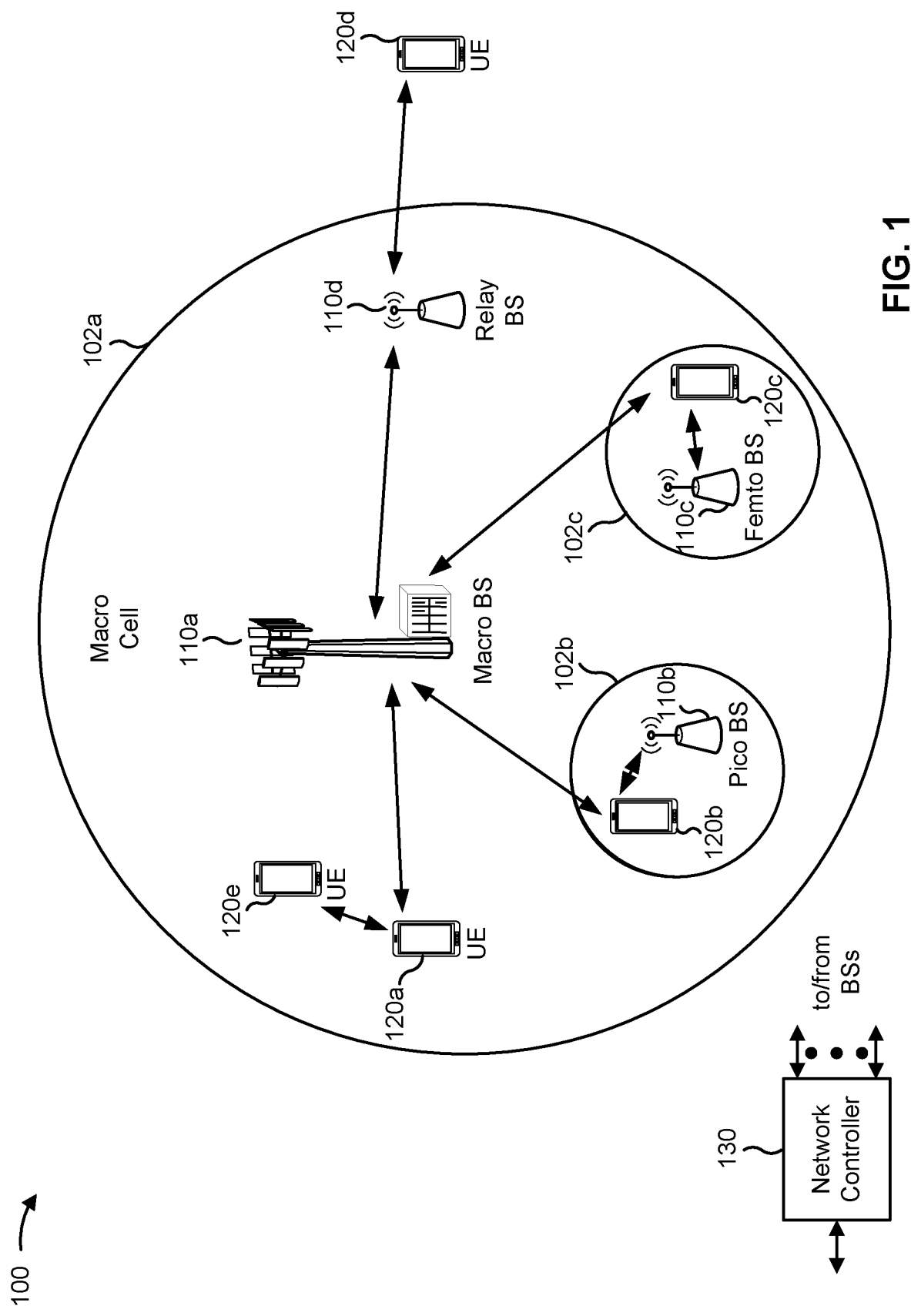
FIG. 1 is a diagram illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V21) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
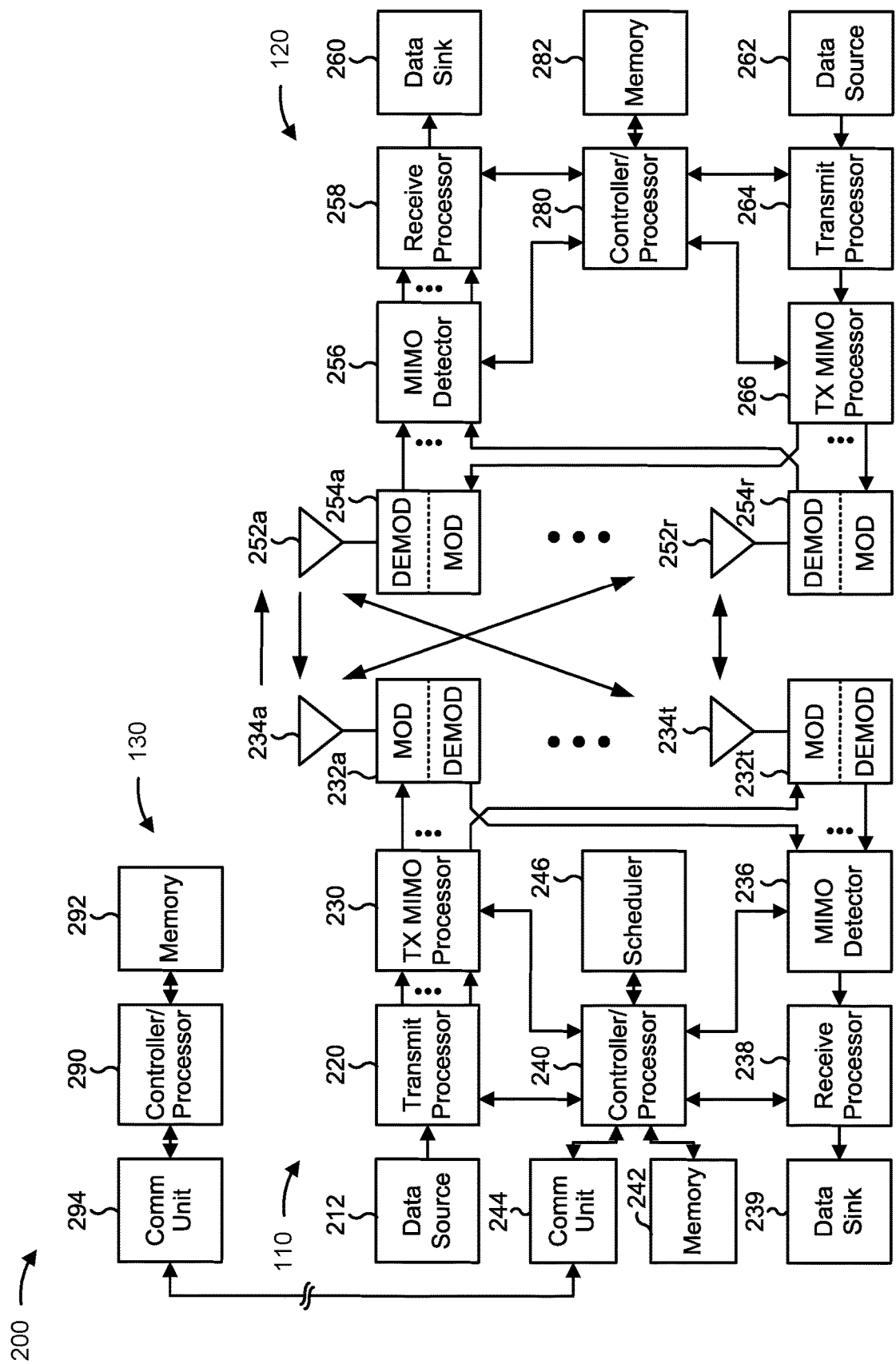
FIG. 2 is a diagram illustrating an example of a base station in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-8).

Controller/processor 240 of base station 110, controller/processor 280 of UE 120, and/or any other component(s) of FIG. 2 may perform one or more techniques associated with uplink data scheduling for predictable traffic, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for determining a configuration of a periodicity and a burst size for periodically transmitting uplink data communications to a base station, means for transmitting an indication of the configuration, means for periodically receiving, from the base station, uplink data grants based at least in part on the periodicity and the burst size of the configuration, means for periodically transmitting, to the base station, uplink data communications based at least in part on the periodicity and the burst size of the configuration, where each uplink data communication is based at least in part on an uplink data grant. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for periodically transmitting uplink grants to a UE for respective uplink data communications, based at least in part on a configuration of a periodicity and a burst size that the UE uses for periodically transmitting uplink data communications, means for periodically receiving, from the UE, uplink data communications based at least in part on periodically transmitting the uplink grants, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of extended reality (XR) application characteristics, in accordance with the present disclosure. FIG. 3 shows uplink and downlink features and requirements for XR application types of cloud gaming, virtual reality (VR), and augmented reality (AR).

As shown in FIG. 3, uplink data communications for XR applications may involve predictable traffic. For example, cloud gaming applications may need frequent, quick updates of a player's position, status, and viewpoint. VR applications may need frequent, quick updates of a player pose for realistic gameplay. Accordingly, XR applications may require uplink data communications that are regular, small packets. FIG. 3 shows that XR applications may involve a user data plane (UDP) packet format with small sizes of 100 bytes (B) or 1 kilobyte (KB). Bit rates may be between 640 and 2300 kilobytes per second (Kbps) with a file error rate (FER) of 1%.

XR applications may require the regular, small packets to have low latency. For example, cloud gaming may require periodic packet arrivals of 10 milliseconds (ms) and a packet delay budget of 10 ms, while VR and AR may require periods of 1.25 ms. Downlink traffic may involve larger files of 4 KB or 60 KB and bit rates of 25-250 megabits per second (Mbps). The larger files may arrive about every 3 ms with packet delay budgets of 10 ms to 15 ms.

As indicated above, FIG. 3 is provided as an example. Other examples may differ from what is described with respect to FIG. 3.

Figure 4:
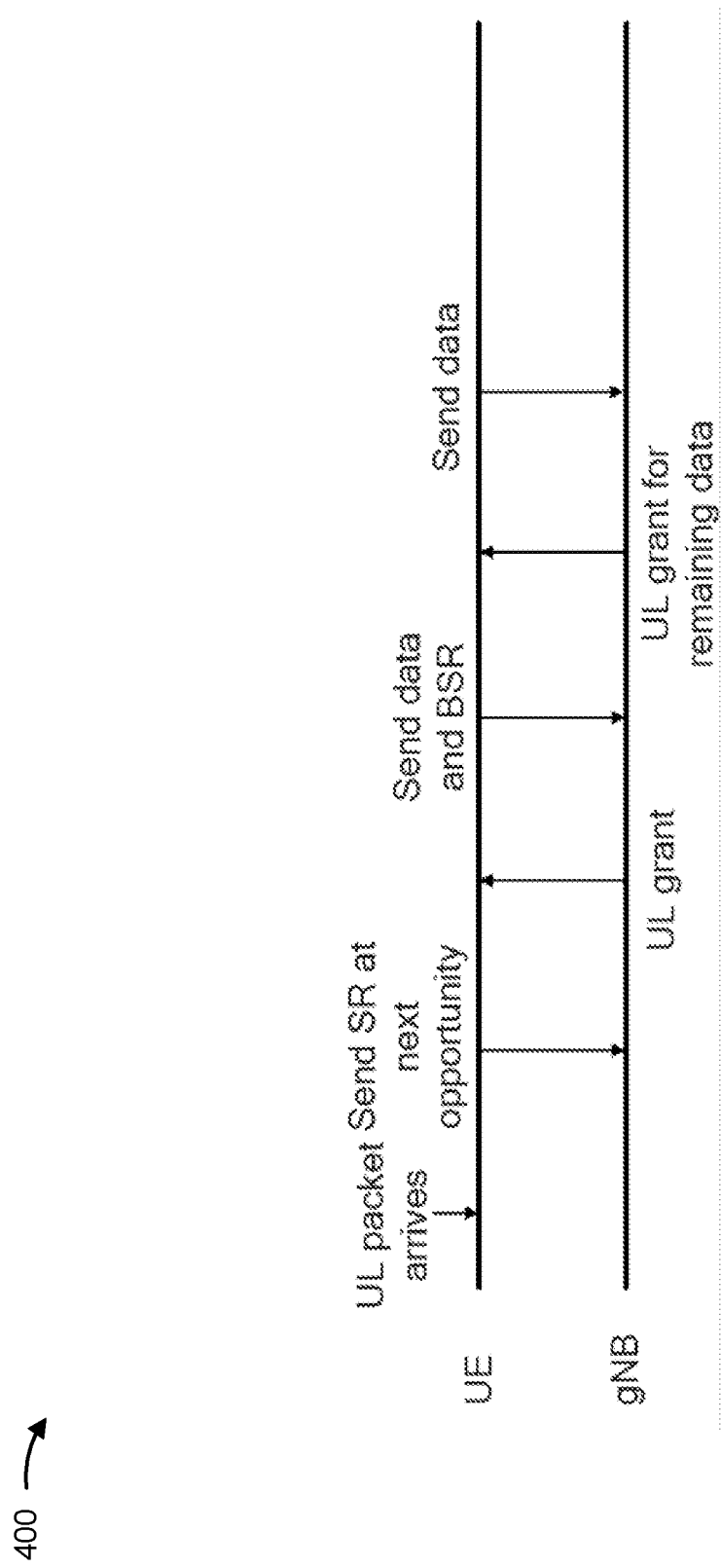
FIG. 4 is a diagram illustrating an example of signal timing for uplink data communications, in accordance with the present disclosure.

FIG. 4 is a diagram illustrating an example 400 of signal timing for uplink data communications, in accordance with the present disclosure.

Uplink data communications that involve a typical scheduling request (SR) and buffer status report (BSR) waste valuable packet delay budget. For example, FIG. 4 shows a signal timing for a process of a UE transmitting uplink data communications to a base station (e.g., gNB). When a UE is to transmit uplink data, new data triggers a BSR. If there is not a grant to transmit the BSR, the UE may transmit an SR on a physical uplink control channel according to an SR configuration. The gNB may then transmit an uplink grant to the UE. The UE may use the uplink grant to transmit an uplink data communication and a BSR. The gNB may transmit an uplink grant for any remaining data, and the UE may transmit another uplink data communication. In sum, the step of transmitting an SR adds latency to bursty uplink data communications.

Latency is an issue for XR applications or similar applications. One solution for reducing latency in uplink data communications includes semi-persistent scheduling (SPS), which allocates periodic resources to a UE such that an uplink grant is not needed. The UE may use configured resources and an MCS to transmit uplink data communications, and latency may be dictated by a periodicity of an SPS resource. However, the MCS and a frequency allocation for uplink data communications are configured semi-persistently. The UE may not make quick changes to the MCS and the frequency allocation based on short term channel conditions or cell loading. As a result, the UE operates with lower spectral efficiency.

As indicated above, FIG. 4 is provided as an example. Other examples may differ from what is described with respect to FIG. 4.

According to various aspects described herein, a base station (e.g., gNB) may periodically transmit uplink grants to a UE based at least in part a configuration that specifies a periodicity and a burst size for transmitting uplink data communications. The UE may periodically transmit uplink data communications based at least in part on the uplink grants, where each uplink grant is for an uplink data communication. Because the configuration (with its periodicity) takes advantage of predictable traffic patterns for XR applications (for example), the UE may eliminate the SR request from the process of transmitting uplink data communications. As a result, latency is reduced. Because each uplink grant may adjust an MCS or a frequency allocation based at least in part on channel or loading conditions, the corresponding uplink data communications may be more flexible and efficient than when SPS is used. In some aspects, the UE may indicate, in uplink data communications, whether the gNB is to transmit another uplink grant for another uplink data communication. This indication enables additional flexibility for transmitting uplink data communications.

Figure 5:
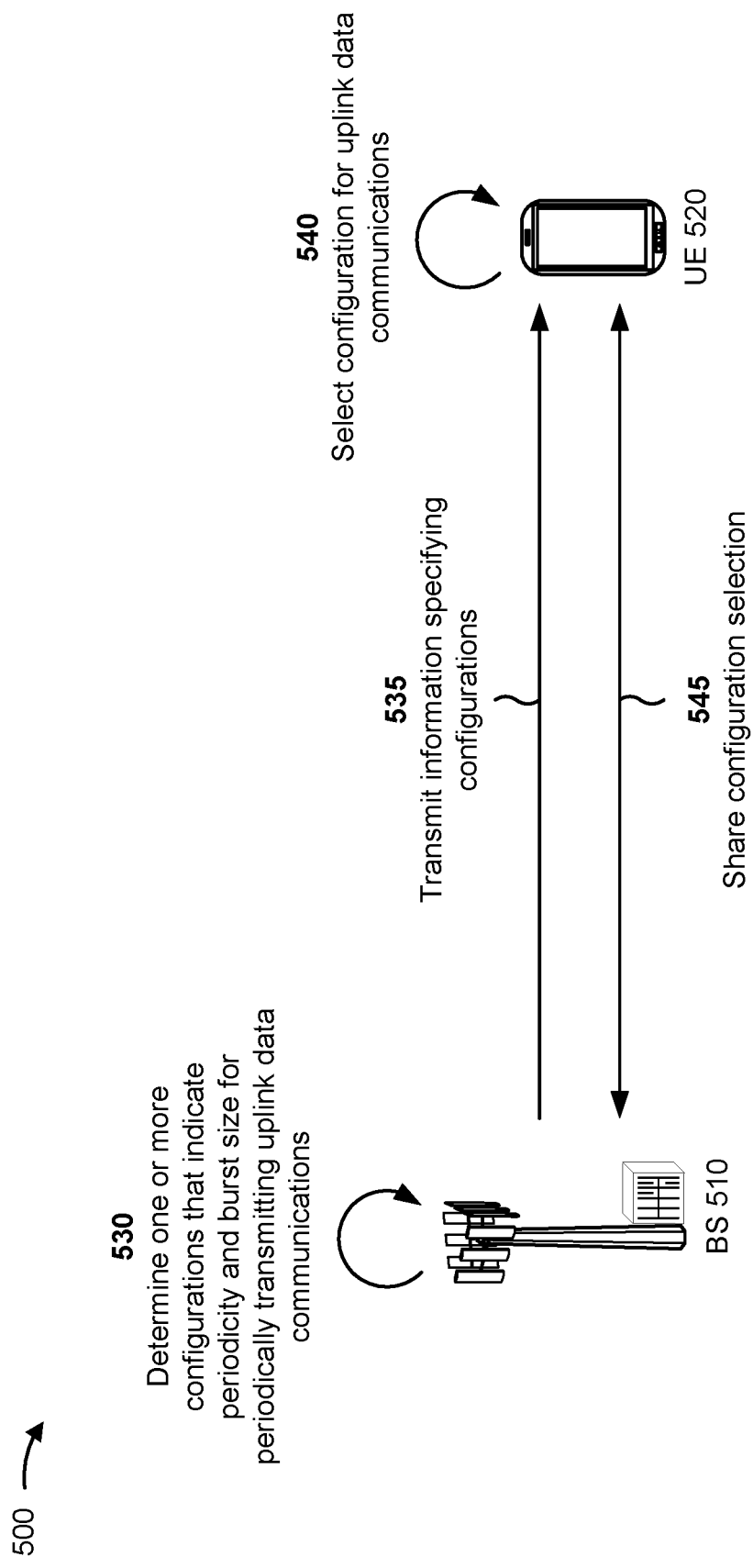
FIG. 5 is a diagram illustrating an example of a base station configuring a UE for periodic uplink data communications for predictable traffic, in accordance with the present disclosure.

FIG. 5 is a diagram illustrating an example 500 of a base station configuring a UE for periodic uplink data communications for predictable traffic, in accordance with the present disclosure. FIG. 5 shows a BS 510 (e.g., a BS 110 depicted in FIGS. 1 and 2, the gNB depicted in FIG. 4) and a UE 520 (e.g., a UE 120 depicted in FIGS. 1 and 2, the UE depicted in FIG. 4).

As shown by reference number 530, BS 510 may determine one or more configurations that individually indicate a periodicity for periodically transmitting uplink data communications. Each configuration may also include a burst size for the uplink data communications. BS 510 may determine the configurations based at least in part on traffic characteristics and parameters for an XR connection. BS 510 may determine the traffic characteristics and parameters during data radio bearer establishment of the XR connection. The configurations may be based at least in part on a quality of service (QoS) profile.

As shown by reference number 535, BS 510 may transmit information specifying the configurations, and may transmit the information in a radio resource control (RRC) message. BS 510 may transmit the information as part of establishing the XR connection or after establishing the XR connection. Note that while XR connections are described as an example, various aspects are also applicable to other types of connections and applications with predictable traffic (or even unpredictable traffic).

As shown by reference number 540, UE 520 may select a configuration from among the one or more configurations. UE 520 may select a configuration based at least in part on an amount of data to transfer, XR application settings, an XR connection, channel conditions, loading conditions, and/or a UE capability. As shown by reference number 545, UE 520 may share the configuration selection. For example, UE 520 may transmit an indication of the selected configuration, and BS 510 may transmit uplink grants according to the configuration. The indication may be a request to use a configuration. In some aspects, BS 510 may transmit an instruction to UE 520 to use a particular configuration.

During the XR connection, if UE 520 determines that a scheduling periodicity and/or a burst size needs to be changed (e.g., due to the traffic conditions, loading conditions), UE 520 may transmit a medium access control control element (MAC-CE) to BS 510 requesting a configuration change.

In some aspects, the configurations may each be associated with an index (e.g., number, letter, position, code). UE 520 may request another configuration by indicating an index for the other configuration in a MAC-CE. Indicating an index in a MAC-CE enables quick adaptation based at least in part on changing conditions. The index that is selected may be an index of a configuration that best matches an uplink data profile or quality of service profile.

While UE 520 may receive multiple configurations (e.g., list) to choose from, additionally or alternatively, UE 520 may initially request a periodicity (within a defined range of options) and/or a burst size during establishment of the XR connection. For example, UE 520 may transmit a preferred configuration of a periodicity and a burst size in UE assistance information (in an RRC message such as an RRC response message). The initial request may be made similarly to a request for a preferred discontinuous reception cycle. In some aspects, UE 520 may machine learn appropriate configurations that are based at least in part on conditions or changing conditions, and UE 520 and BS 510 may utilize such machine learning for determining a periodicity and a burst size. Initially requesting a certain configuration of periodicity and burst size during XR connection establishment may be more suited to scenarios where traffic characteristics and/or conditions are less known before establishing the XR connection. In some aspects, UE 520 may later request, via a MAC-CE for example, an increase or decrease in the periodicity and/or the burst size. The increase or decrease may be based at least in part on preconfigured amounts for an increase or decrease.

In some aspects, UE 520 may determine a new configuration with a periodicity and a burst size based at least in part on channel conditions, loading conditions, an amount of data to transfer, and/or a UE capability. UE 520 may transmit information specifying the new configuration to BS 510. BS 510 may add the new configuration to the configurations.

As indicated above, FIG. 5 is provided as an example. Other examples may differ from what is described with respect to FIG. 5.

Figure 6:
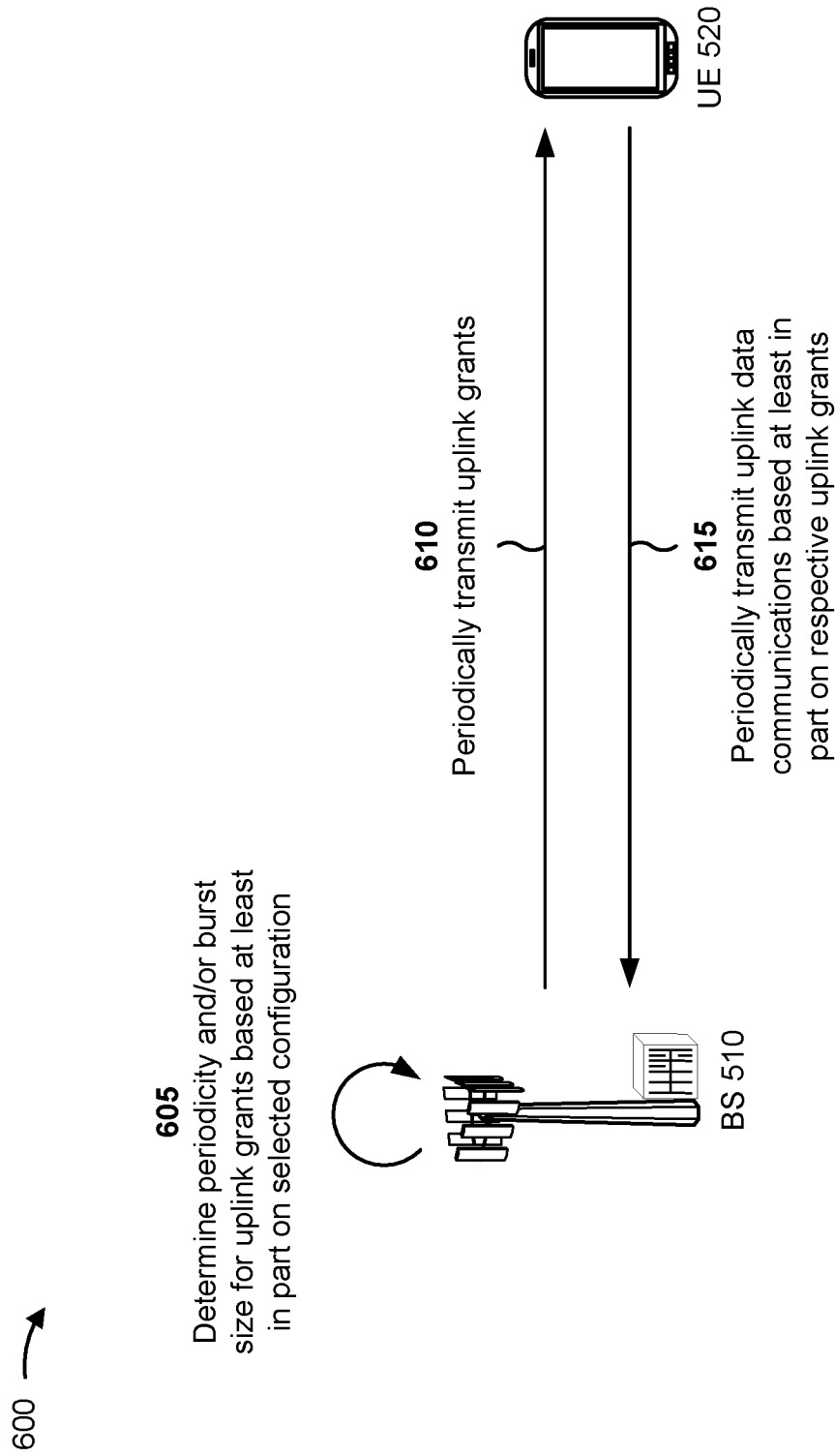
FIG. 6 is a diagram illustrating an example of uplink data scheduling for predictable traffic, in accordance with the present disclosure.

FIG. 6 is a diagram illustrating an example 600 of uplink data scheduling for predictable traffic, in accordance with the present disclosure. FIG. 6 shows BS 510 and UE 520 from FIG. 5, where UE 520 may have determined a configuration for periodic transmission of uplink data communications, as described in connection with FIG. 5.

As shown by reference number 605, BS 510 may determine a periodicity (and a burst size) for uplink grants based at least in part on the configuration that UE 520 selected. For each uplink grant, BS 510 may determine an MCS and/or a frequency allocation for a respective uplink data communication from UE 520, based at least in part on channel conditions, loading conditions, a location of the UE, traffic characteristics for a connection to the UE, parameters for the connection, and/or the like.

As shown by reference number 610, BS 510 may periodically transmit uplink grants. BS 510 may periodically transmit uplink grants based at least in part on an amount of data to transfer. Uplink grants may individually indicate the MCS or the frequency allocation. If BS 510 follows the configuration, BS 510 may periodically transmit uplink grants and perform grant-based uplink scheduling as if UE 520 transmitted an SR and a BSR. In other words, BS 510 may periodically transmit uplink grants independent of an SR and a BSR from UE 520. Because BS 510 is still transmitting an uplink grant for a corresponding uplink data communication from UE 520, BS 510 and UE 520 may independently use an MCS and a frequency allocation for each individual uplink data communication based at least in part on current channel and loading conditions. This per-grant adaptation enables more efficient signaling than SPS, which may not enable per-grant adaptation of the MCS and the frequency allocation. Note that while UE 520 may not transmit SRs and BSRs for uplink data communications for a particular connection and/or application, UE 520 may continue to transmit regular SRs and BSRs for other uplink traffic.

As shown by reference number 615, UE 520 may periodically transmit uplink data communications based at least in part on respective uplink grants. For example, UE 520 may receive an uplink grant from BS 510 and then transmit an uplink data communication in response to the uplink grant. UE 520 may transmit uplink data communications according to a periodicity and burst size of a configuration that UE 520 determined to use.

Traffic patterns for UE 520 or an amount of data for each burst may change. UE 520 may transmit an indication or a request to BS 510 to change to another configuration of periodicity and burst size. The indication or request may be made in a MAC-CE or in other uplink control information (UCI). For example, if channel conditions for UE 520 improve, UE 520 may use (or request) a configuration that decreases a size of each period and/or increases a size of each burst. In another example, when UE 520 moves to a cell edge and throughput drops, UE 520 may decrease a burst size but schedule more frequent uplink data communications.

In some aspects, UE 520 may make "in-band" requests for scheduling. In other words, BS 510 may rely on a dynamic indication from UE 520 for a next uplink grant. For example, UE 520 may transmit, in or with a data uplink communication, an indication whether to provide a next uplink grant. UE 520 may include the indication as a bit in a MAC-CE. A logical channel priority of this MAC-CE may be higher than priorities of other MAC-CEs and data (except some control channel messages), such that the MACE CE may be sent even if an uplink grant is limited in size.

In some aspects, UE 520 may include the indication in UCI that is multiplexed with uplink data. For example, the UCI may be the same as an existing SR UCI (e.g., existing SR bit). If the SR is multiplexed with physical uplink shared channel data, BS 510 may schedule the next uplink grant. Otherwise, BS 510 may not schedule the next uplink grant. In some aspects, UE 520 may use an SR as a new control signal.

In some aspects, if the indication whether to provide a next uplink grant is positive (UE 520 has data to transfer), BS 510 may transmit a next uplink grant. UE 520 may then transmit a next uplink data communication that uses the next uplink grant. BS 510 may transmit the next uplink grant and UE 520 may transmit the next uplink data communication according to a periodicity and burst size of a current configuration. As long as UE 520 keeps requesting a next uplink grant, no SR and/or BSR is needed and latency is reduced.

In some aspects, if the indication is negative, BS 510 may not provide an uplink grant until UE 520 requests an uplink grant. When appropriate, UE 520 may use an SR to restart periodically receiving uplink grants and periodically transmitting uplink data communications. Alternatively, and or additionally, a negative indication may cause BS 510 to refrain from transmitting uplink grants for a specified time period or for a specified quantity of uplink grants before resuming transmitting an uplink grant. By providing per-grant instructions, BS 510 and UE 520 may use signaling resources more efficiently.

As indicated above, FIG. 6 is provided as an example. Other examples may differ from what is described with respect to FIG. 6.

Figure 7:
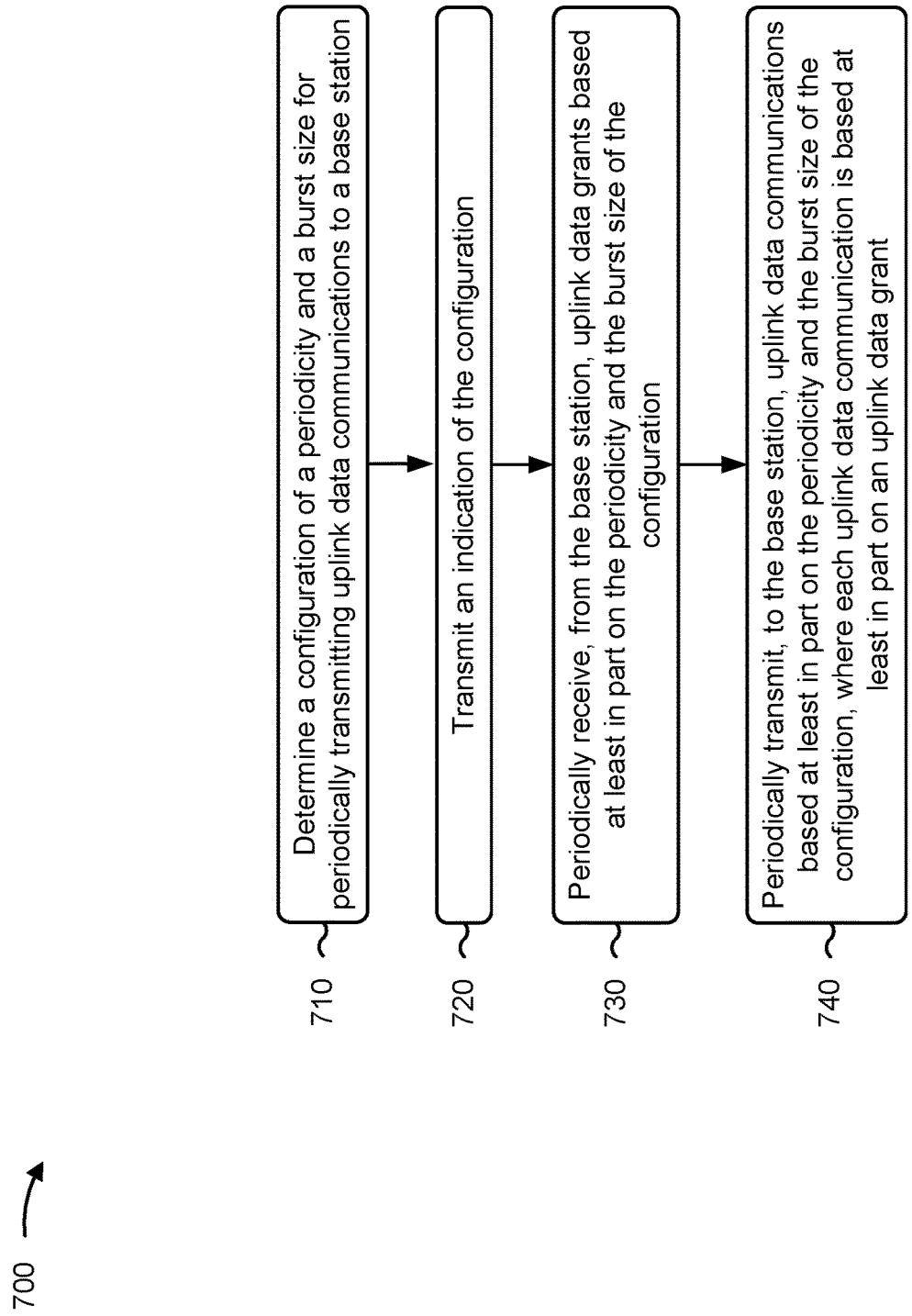
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120, UE 520) performs operations associated with uplink data scheduling for predictable traffic.

As shown in FIG. 7, in some aspects, process 700 may include determining a configuration of a periodicity and a burst size for periodically transmitting uplink data communications to a base station (block 710). For example, the UE (e.g., using receive processor 258, transmit processor 264, controller/processor 280, memory 282) may determine a configuration of a periodicity and a burst size for periodically transmitting uplink data communications to a base station, as described above.

As further shown in FIG. 7, in some aspects, process 700 may include transmitting an indication of the configuration (block 720). For example, the UE (e.g., using transmit processor 264, controller/processor 280, memory 282) may transmitting an indication of the configuration, as described above.

As further shown in FIG. 7, in some aspects, process 700 may include periodically receiving, from the base station, uplink data grants based at least in part on the periodicity and the burst size of the configuration (block 730). For example, the UE (e.g., using receive processor 258, controller/processor 280, memory 282) may periodically receive, from the base station, uplink data grants based at least in part on the periodicity and the burst size of the configuration, as described above.

As further shown in FIG. 7, in some aspects, process 700 may include periodically transmitting, to the base station, uplink data communications based at least in part on the periodicity and the burst size of the configuration (block 740). For example, the UE (e.g., using transmit processor 264, controller/processor 280, memory 282) may periodically transmit, to the base station, uplink data communications based at least in part on the periodicity and the burst size of the configuration, as described above. In some aspects, each uplink data communication is based at least in part on an uplink data grant.

Process 700 may include additional aspects, such as any single aspect or any combination of aspects described below and/or in connection with one or more other processes described elsewhere herein.

In a first aspect, determining the configuration includes receiving, from the base station, an instruction to use the configuration.

In a second aspect, alone or in combination with the first aspect, determining the configuration includes receiving, from the base station, information specifying one or more configurations that indicate a periodicity and a burst size for periodically transmitting uplink data communications, and selecting the configuration from among the one or more configurations.

In a third aspect, alone or in combination with one or more of the first and second aspects, process 700 includes transmitting, to the base station, a request to use the configuration in a MAC-CE.

In a fourth aspect, alone or in combination with one or more of the first through third aspects, each of the one or more configurations corresponds to a respective index, and transmitting the request in the MAC-CE includes transmitting an indication of an index for the configuration. Process 700 may also include transmitting the configuration explicitly.

In a fifth aspect, alone or in combination with one or more of the first through fourth aspects, process 700 includes determining to use another configuration of the one or more configurations and transmitting, in a MAC-CE, a request to use the other configuration.

In a sixth aspect, alone or in combination with one or more of the first through fifth aspects, process 700 includes determining a new configuration based at least in part on one or more of channel conditions, loading conditions, an amount of data to transfer, or a UE capability, and transmitting information specifying the new configuration to the base station to be added to the one or more configurations.

In a seventh aspect, alone or in combination with one or more of the first through sixth aspects, transmitting the information specifying the new configuration includes transmitting the information in an RRC configuration message.

In an eighth aspect, alone or in combination with one or more of the first through seventh aspects, process 700 includes transmitting a request for the configuration in an RRC configuration message.

In a ninth aspect, alone or in combination with one or more of the first through eighth aspects, the request is included in UE assistance information.

In a tenth aspect, alone or in combination with one or more of the first through ninth aspects, periodically transmitting the uplink data communications includes transmitting an uplink data communication that includes an indication to provide a next uplink grant for a next uplink data communication.

In an eleventh aspect, alone or in combination with one or more of the first through tenth aspects, the indication is included in a MAC-CE.

In a twelfth aspect, alone or in combination with one or more of the first through eleventh aspects, the indication is included in UCI.

In a thirteenth aspect, alone or in combination with one or more of the first through twelfth aspects, periodically transmitting the uplink data communications includes transmitting an uplink data communication with an indication for the base station to not provide a next uplink grant for a next uplink data communication.

In a fourteenth aspect, alone or in combination with one or more of the first through thirteenth aspects, the indication indicates for the base station to not provide uplink grants for one or more of a time period or a specified quantity of uplink grants.

In a fifteenth aspect, alone or in combination with one or more of the first through fourteenth aspects, process 700 includes transmitting an SR for the base station to resume periodically transmitting the uplink grants.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
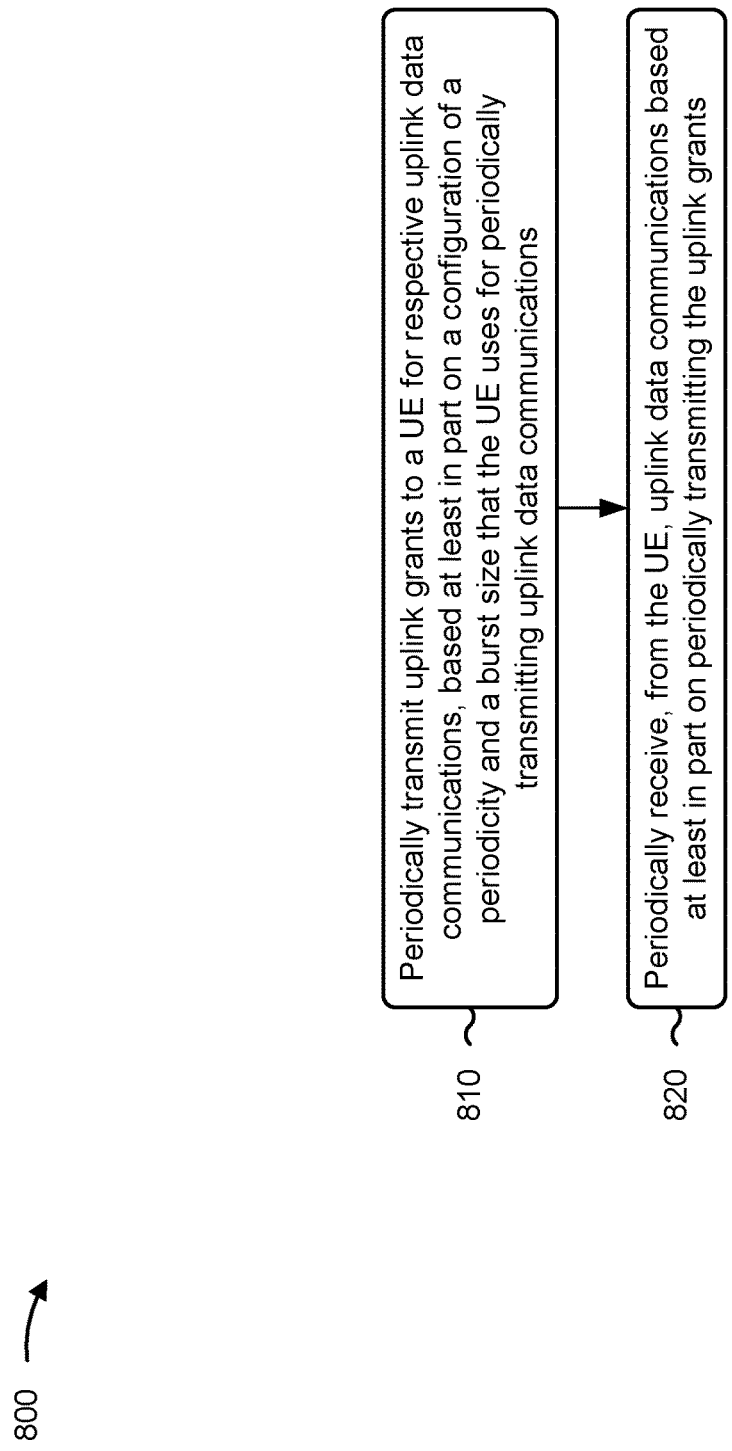
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110, BS 510) performs operations associated with uplink data scheduling for predictable traffic.

As shown in FIG. 8, in some aspects, process 800 may include periodically transmitting uplink grants to a UE for respective uplink data communications, based at least in part on a configuration of a periodicity and a burst size that the UE uses for periodically transmitting uplink data communications (block 810). For example, the base station (e.g., using transmit processor 220, receive processor 238, controller/processor 240, memory 242) may periodically transmit uplink grants to a UE for respective uplink data communications, based at least in part on a configuration of a periodicity and a burst size that the UE uses for periodically transmitting uplink data communications, as described above.

As further shown in FIG. 8, in some aspects, process 800 may include periodically receiving, from the UE, uplink data communications based at least in part on periodically transmitting the uplink grants (block 820). For example, the base station (e.g., using transmit processor 220, receive processor 238, controller/processor 240, memory 242) may periodically receive, from the UE, uplink data communications based at least in part on periodically transmitting the uplink grants, as described above.

Process 800 may include additional aspects, such as any single aspect or any combination of aspects described below and/or in connection with one or more other processes described elsewhere herein.

In a first aspect, periodically transmitting the uplink grants includes periodically transmitting the uplink grants based at least in part on an amount of data to transfer.

In a second aspect, alone or in combination with the first aspect, periodically transmitting the uplink grants includes determining, for an uplink grant, one or more of an MCS or a frequency allocation for a respective uplink data communication, based at least in part on one or more of channel conditions, loading conditions, a location of the UE, traffic characteristics for a connection to the UE, or parameters for the connection, and transmitting the uplink grant with an indication of the one or more of the MCS or the frequency allocation.

In a third aspect, alone or in combination with one or more of the first and second aspects, process 800 includes determining one or more configurations that indicate a periodicity and a burst size for periodically transmitting uplink data communications, based at least in part on one or more of channel conditions, loading conditions, a location of the UE, traffic characteristics for a connection to the UE, or parameters for the connection, and transmitting information specifying the one or more configurations to the UE.

In a fourth aspect, alone or in combination with one or more of the first through third aspects, determining the one or more configurations includes determining one or more configurations based at least in part on a QoS profile of traffic during connection setup.

In a fifth aspect, alone or in combination with one or more of the first through fourth aspects, process 800 includes transmitting an indication of a selected configuration of the one or more configurations for the UE to use as the configuration for periodically transmitting uplink data communications.

In a sixth aspect, alone or in combination with one or more of the first through fifth aspects, process 800 includes receiving, from the UE, a request to use a configuration from among the one or more configurations, determining whether to grant the request, and transmitting an indication that the request for the configuration is granted based at least in part on determining to grant the request.

In a seventh aspect, alone or in combination with one or more of the first through sixth aspects, each of the one or more configurations corresponds to a respective index, and receiving the request includes receiving an indication of an index for the configuration.

In an eighth aspect, alone or in combination with one or more of the first through seventh aspects, the indication is included in a MAC-CE.

In a ninth aspect, alone or in combination with one or more of the first through eighth aspects, process 800 includes receiving information specifying a new configuration from the UE to add to the one or more configurations, and adding the new configuration to the one or more configurations.

In a tenth aspect, alone or in combination with one or more of the first through ninth aspects, receiving the information specifying the new configuration includes receiving the information in an RRC configuration message.

In an eleventh aspect, alone or in combination with one or more of the first through tenth aspects, process 800 includes receiving, from the UE in an RRC configuration message, a request to use the configuration, determining whether to grant the request, and transmitting an indication from the base station that the request for the configuration is granted based at least in part on determining to grant the request.

In a twelfth aspect, alone or in combination with one or more of the first through eleventh aspects, the request is included in UE assistance information.

In a thirteenth aspect, alone or in combination with one or more of the first through twelfth aspects, periodically receiving the uplink data communications includes receiving an uplink data communication that includes an indication to provide a next uplink grant for a next periodic uplink data communication, and transmitting the next uplink grant based at least in part on the indication.

In a fourteenth aspect, alone or in combination with one or more of the first through thirteenth aspects, the indication is included in a MAC-CE.

In a fifteenth aspect, alone or in combination with one or more of the first through fourteenth aspects, the indication is included in UCI.

In a sixteenth aspect, alone or in combination with one or more of the first through fifteenth aspects, periodically receiving the uplink data communications includes receiving an uplink data communication that includes an indication to not provide a next uplink grant for a next periodic uplink data communication, and refraining from transmitting a next uplink grant based at least in part on the indication.

In a seventeenth aspect, alone or in combination with one or more of the first through sixteenth aspects, process 800 includes receiving an SR with an indication to resume periodically transmitting uplink grants, and resuming periodically transmitting the uplink grants based at least in part on receiving the SR.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: transmitting an indication of a configuration of a periodicity and a burst size for periodically transmitting uplink data communications to a base station; periodically receiving, from the base station, uplink data grants based at least in part on the periodicity and the burst size of the configuration; and periodically transmitting, to the base station, uplink data communications based at least in part on the periodicity and the burst size of the configuration, wherein each uplink data communication is based at least in part on an uplink data grant.

Aspect 2: The method of Aspect 1, further comprising receiving, from the base station, an instruction to use the configuration.

Aspect 3: The method of Aspect 1 or 2, further comprising: receiving, from the base station, information specifying one or more configurations that indicate a periodicity and a burst size for periodically transmitting uplink data communications; and selecting the configuration from among the one or more configurations.

Aspect 4: The method of Aspect 3, wherein the indication is transmitted in a medium access control control element (MAC-CE).

Aspect 5: The method of Aspect 3, wherein each of the one or more configurations corresponds to a respective index, and transmitting the indication includes transmitting an indication of an index for the configuration.

Aspect 6: The method of Aspect 3, further comprising: determining to use another configuration of the one or more configurations; and transmitting, in a medium access control control element (MAC-CE), an indication of the other configuration.

Aspect 7: The method of Aspect 3, further comprising: determining a new configuration based at least in part on one or more of channel conditions, loading conditions, an amount of data to transfer, or a UE capability; and transmitting information specifying the new configuration to the base station to be added to the one or more configurations.

Aspect 8: The method of Aspect 7, wherein transmitting the information specifying the new configuration includes transmitting the information in a radio resource control configuration response message.

Aspect 9: The method of any of Aspects 1-8, wherein the indication is transmitted in a radio resource control configuration response message.

Aspect 10: The method of Aspect 9, wherein the indication is included in UE assistance information.

Aspect 11: The method of any of Aspects 1-10, wherein periodically transmitting the uplink data communications includes transmitting an uplink data communication that includes an indication to provide a next uplink grant for a next uplink data communication.

Aspect 12: The method of Aspect 11, wherein the indication to provide the next uplink grant is included in a medium access control control element (MAC-CE).

Aspect 13: The method of Aspect 11, wherein the indication to provide the next uplink grant is included in uplink control information.

Aspect 14: The method of any of Aspects 1-10, wherein periodically transmitting the uplink data communications includes transmitting an uplink data communication with an indication for the base station to not provide a next uplink grant for a next uplink data communication.

Aspect 15: The method of Aspect 14, wherein the indication to not provide a next uplink grant indicates for the base station to not provide uplink grants for one or more of a time period or a specified quantity of uplink grants.

Aspect 16: The method of Aspect 14, further comprising transmitting a scheduling request for the base station to resume periodically transmitting the uplink grants.

Aspect 17: A method of wireless communication performed by a base station, comprising: periodically transmitting uplink grants to a user equipment (UE) for respective uplink data communications, based at least in part on a configuration of a periodicity and a burst size that the UE uses for periodically transmitting uplink data communications; and periodically receiving, from the UE, uplink data communications based at least in part on periodically transmitting the uplink grants.

Aspect 18: The method of Aspect 17, wherein periodically transmitting the uplink grants includes periodically transmitting the uplink grants based at least in part on an amount of data to transfer.

Aspect 19: The method of Aspect 17 or 18, wherein periodically transmitting the uplink grants includes: determining, for an uplink grant, one or more of a modulation and coding scheme (MCS) or a frequency allocation for a respective uplink data communication, based at least in part on one or more of channel conditions, loading conditions, a location of the UE, traffic characteristics for a connection to the UE, or parameters for the connection; and transmitting the uplink grant with an indication of the one or more of the MCS or the frequency allocation.

Aspect 20: The method of any of Aspects 17-19, further comprising: determining one or more configurations that indicate a periodicity and a burst size for periodically transmitting uplink data communications, based at least in part on one or more of channel conditions, loading conditions, a location of the UE, traffic characteristics for a connection to the UE, or parameters for the connection; and transmitting information specifying the one or more configurations to the UE.

Aspect 21: The method of Aspect 20, wherein determining the one or more configurations includes determining one or more configurations based at least in part on a quality of service profile of traffic during connection setup.

Aspect 22: The method of Aspect 20, further comprising transmitting an indication of a selected configuration of the one or more configurations for the UE to use as the configuration for periodically transmitting uplink data communications.

Aspect 23: The method of Aspect 20, further comprising: receiving, from the UE, a request to use a configuration from among the one or more configurations; determining whether to grant the request; and transmitting uplink grants according to the configuration.

Aspect 24: The method of Aspect 23, wherein each of the one or more configurations corresponds to a respective index, and receiving the request includes receiving an indication of an index for the configuration.

Aspect 25: The method of Aspect 20, further comprising: receiving information specifying a new configuration from the UE to add to the one or more configurations; and adding the new configuration to the one or more configurations.

Aspect 26: The method of Aspect 25, wherein receiving the information specifying the new configuration includes receiving the information in a radio resource control configuration message.

Aspect 27: The method of any of Aspects 17-26, further comprising: receiving, from the UE in a radio resource control configuration response message, a request to use the configuration; determining whether to grant the request; and transmitting uplink grants according to the configuration.

Aspect 28: The method of any of Aspects 17-27, wherein periodically receiving the uplink data communications includes: receiving an uplink data communication that includes an indication to provide a next uplink grant for a next periodic uplink data communication; and transmitting the next uplink grant based at least in part on the indication.

Aspect 29: The method of any of Aspects 17-27, wherein periodically receiving the uplink data communications includes: receiving an uplink data communication that includes an indication to not provide a next uplink grant for a next periodic uplink data communication; and refraining from transmitting a next uplink grant based at least in part on the indication.

Aspect 30: The method of Aspect 33, further comprising: receiving a scheduling request with an indication to resume periodically transmitting uplink grants; and resuming periodically transmitting the uplink grants based at least in part on receiving the scheduling request.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the memory and the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, the one or more processors individually or collectively configured to cause the UE to:
      transmit an indication of an index of a configuration, wherein the configuration comprises a periodicity and a burst size for periodically transmitting uplink data communications to a base station, wherein the index corresponds to the periodicity and the burst size;
      periodically receive, from the base station based at least in part on the periodicity and the burst size of the configuration, uplink data grants; and
      periodically transmit, to the base station, uplink data communications according to the periodicity and the burst size of the configuration, wherein each uplink data communication is based at least in part on an uplink data grant.

2. The UE of claim 1, wherein the one or more processors are configured to cause the UE to:
   receive, from the base station, information specifying one or more configurations wherein each of the one or more configurations each indicate the periodicity and the burst size for periodically transmitting uplink data communications; and
   select the configuration from among the one or more configurations.

3. The UE of claim 2, wherein the indication of an index of a configuration is transmitted in a medium access control control element (MAC-CE).

4. The UE of claim 2, wherein each of the one or more configurations corresponds to a respective index.

5. The UE of claim 2, wherein the one or more processors are configured to cause the UE to:
   determine to use another configuration of the one or more configurations; and
   transmit, in a medium access control control element (MAC-CE), an indication of the other configuration.

6. The UE of claim 2, wherein the one or more processors are configured to cause the UE to:
   determine a new configuration based at least in part on one or more of channel conditions, loading conditions, an amount of data to transfer, or a UE capability; and
   transmit information specifying the new configuration to the base station to be added to the one or more configurations.

7. The UE of claim 6, wherein the one or more processors, to transmit the information specifying the new configuration, are configured to transmit the information in a radio resource control configuration response message.

8. The UE of claim 1, wherein the indication of an index of a configuration is transmitted in a radio resource control configuration response message.

9. The UE of claim 8, wherein the indication of an index of a configuration is included in UE assistance information.

10. The UE of claim 1, wherein the one or more processors, to periodically transmit the uplink data communications, are configured to cause the UE to:
    transmit an uplink data communication that includes an indication to provide a next uplink grant for a next uplink data communication.

11. The UE of claim 10, wherein the indication to provide the next uplink grant is included in a medium access control control element (MAC-CE).

12. The UE of claim 10, wherein the indication to provide the next uplink grant is included in uplink control information.

13. The UE of claim 1, wherein the one or more processors, to periodically transmit the uplink data communications, are configured to cause the UE to:
transmit an uplink data communication with an indication for the base station to not provide a next uplink grant for a next uplink data communication.

14. The UE of claim 13, wherein the indication to not provide a next uplink grant indicates for the base station to not provide uplink grants for one or more of a time period or a specified quantity of uplink data grants.

15. The UE of claim 13, wherein the one or more processors are further configured to cause the UE to:
transmit a scheduling request for the base station to resume periodically transmitting the uplink data grants.

16. A base station for wireless communication, comprising:
one or more memories; and
one or more processors, coupled to the one or more memories, the one or more processors individually or collectively configured cause the base station to:
receive an indication of an index of a configuration, wherein the configuration comprises a periodicity and a burst size for periodically receiving uplink data communications from a user equipment (UE), wherein the index corresponds to the periodicity and the burst size;
periodically transmit, according to the periodicity, uplink grants to a UE for respective uplink data communications, based at least in part on a configuration of the periodicity and the burst size, wherein the UE uses the periodicity and the burst size for periodically transmitting uplink data communications; and
periodically receive, from the UE according to the periodicity and the burst size of the configuration, uplink data communications based at least in part on periodically transmitting the uplink grants.

17. The base station of claim 16, wherein the one or more processors, to periodically transmit the uplink grants, are configured to cause the base station to:
periodically transmit the uplink grants based at least in part on an amount of data to transfer.

18. The base station of claim 16, wherein the one or more processors, to periodically transmit the uplink grants, are configured to cause the base station to:
determine, for an uplink grant, one or more of a modulation and coding scheme (MCS) or a frequency allocation for a respective uplink data communication, based at least in part on one or more of channel conditions, loading conditions, a location of the UE, traffic characteristics for a connection to the UE, or parameters for the connection; and
transmit the uplink grant with an indication of the one or more of the MCS or the frequency allocation.

19. The base station of claim 16, wherein the one or more processors are configured to cause the base station to:
determine one or more configurations, wherein each of the one or more configurations each indicate the periodicity and the burst size for periodically transmitting uplink data communications, based at least in part on one or more of channel conditions, loading conditions, a location of the UE, traffic characteristics for a connection to the UE, or parameters for the connection; and
transmit information specifying the one or more configurations to the UE.

20. The base station of claim 19, wherein the one or more processors, to determine the one or more configurations, are configured to determine the one or more configurations based at least in part on a quality of service profile of traffic during connection setup.

21. The base station of claim 19, wherein the one or more processors are configured to transmit an indication of a selected configuration of the one or more configurations for the UE to use as the configuration for periodically transmitting uplink data communications.

22. The base station of claim 19, wherein the one or more processors are configured to cause the base station to:
receive, from the UE, a request to use a configuration from among the one or more configurations;
determine whether to grant the request; and
transmit uplink grants according to the configuration.

23. The base station of claim 22, wherein each of the one or more configurations corresponds to a respective index.

24. The base station of claim 19, wherein the one or more processors are configured to cause the base station to:
receive information specifying a new configuration from the UE to add to the one or more configurations; and
add the new configuration to the one or more configurations.

25. The base station of claim 24, wherein the one or more processors, to receive the information specifying the new configuration, are configured to receive the information in a radio resource control configuration message.

26. The base station of claim 16, wherein the one or more processors are configured to cause the base station to:
receive, from the UE in a radio resource control configuration response message, a request to use the configuration;
determine whether to grant the request; and
transmit uplink grants according to the configuration.

27. The base station of claim 16, wherein the one or more processors, to periodically receive the uplink data communications, are configured to:
receive an uplink data communication that includes an indication to provide a next uplink grant for a next periodic uplink data communication; and
transmit the next uplink grant based at least in part on the indication to provide a next uplink grant for a next periodic uplink data communication.

28. The base station of claim 16, wherein the one or more processors, to periodically receive the uplink data communications, are configured to:
receive an uplink data communication that includes an indication to not provide a next uplink grant for a next periodic uplink data communication; and
refrain from transmitting a next uplink grant based at least in part on the indication to not provide a next uplink grant for a next periodic uplink data communication.

29. A method of wireless communication performed by a user equipment (UE), comprising:
transmitting, by the UE, an indication of an index of a configuration, wherein the configuration comprises a periodicity and a burst size for periodically transmitting uplink data communications to a base station, wherein the index corresponds to the periodicity and the burst size;
periodically receiving, by the UE, from the base station based at least in part on the periodicity and the burst size of the configuration, uplink data grants; and periodically transmitting, by the UE to the base station, uplink data communications according to the periodicity and the burst size of the configuration, wherein each uplink data communication is based at least in part on an uplink data grant.

30. A method of wireless communication performed by a base station, comprising:

receiving, by the base station, an indication of an index of a configuration, wherein the configuration comprises a periodicity and a burst size for periodically receiving uplink data communications from a user equipment (UE), wherein the index corresponds to the periodicity and the burst size;

periodically transmitting, by the base station, according to a periodicity, uplink grants to a UE for respective uplink data communications, based at least in part on a configuration of the periodicity and the burst size, wherein the UE uses the periodicity and the burst size for periodically transmitting uplink data communications; and periodically receiving, by the base station from the UE according to the periodicity and the burst size of the configuration, uplink data communications based at least in part on periodically transmitting the uplink grants.

* * * * *